US012612066B2

(12) United States Patent
Mizoguchi

(10) Patent No.: US 12,612,066 B2
(45) Date of Patent: Apr. 28, 2026

(54) DRIVE ASSIST APPARATUS FOR TRACKING MOVING OBJECTS TEMPORARILY OBSCURED BY NEARBY STATIONARY OBJECTS

(71) Applicant: SUBARU CORPORATION, Tokyo (JP)

(72) Inventor: Masato Mizoguchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 202 days.

(21) Appl. No.: 18/059,068

(22) Filed: Nov. 28, 2022

(65) Prior Publication Data

US 2023/0182769 A1     Jun. 15, 2023

(30) Foreign Application Priority Data

Dec. 13, 2021     (JP) .................................. 2021-201959

(51) Int. Cl.
*B60W 60/00*          (2020.01)
*B60W 30/18*          (2012.01)
*B60W 40/072*         (2012.01)

(52) U.S. Cl.
CPC ........ *B60W 60/001* (2020.02); *B60W 30/181* (2013.01); *B60W 40/072* (2013.01); *B60W 2554/4029* (2020.02)

(58) Field of Classification Search
CPC ............. B60W 60/001; B60W 30/181; B60W 40/072; B60W 2554/4029
See application file for complete search history.

(56) References Cited

U.S. PATENT DOCUMENTS

2018/0056997 A1*   3/2018   Ohmura ................ B60W 10/06
2018/0326995 A1   11/2018   Hiramatsu et al.
(Continued)

FOREIGN PATENT DOCUMENTS

JP        2010-079425 A2     4/2010
JP        2019-204440 A     11/2019
(Continued)

OTHER PUBLICATIONS

English Translation of JP 2008186170 A Title: Driving Support System and Driving Support Method Author: Shiotani et al. Date: Aug. 14, 2008 (Year: 2008).*
(Continued)

*Primary Examiner* — Steven Vu Nguyen
(74) *Attorney, Agent, or Firm* — Rimon P.C.

(57)                    ABSTRACT

A drive assist apparatus includes: a driving environment information obtaining unit that obtains driving environment information ahead of a vehicle; a target course setter that sets a target course; an object recognizer that recognizes a moving object and a stationary object; an object detection area setter that sets an object detection area; and a driving control arithmetic unit that controls the vehicle's driving state. The driving control arithmetic unit includes a before-entering-sharp-curvature controller and a passing-sharp-curvature controller including a lost determiner that determines whether the moving object overlaps with the stationary object and is lost, and a lost retention time setter that sets a lost retention time to be long. The passing-sharp-curvature controller includes a passing speed setter that sets a passing speed to a value less than a speed set when there is no change in the lost retention time.

5 Claims, 16 Drawing Sheets

(56) References Cited

U.S. PATENT DOCUMENTS

| | | |
|---|---|---|
| 2019/0359227 A1 | 11/2019 | Otaki et al. |
| 2020/0180434 A1 | 6/2020 | Tachibana et al. |
| 2020/0307639 A1 | 10/2020 | Tsuji et al. |

FOREIGN PATENT DOCUMENTS

| | | |
|---|---|---|
| JP | 2020-164081 A | 10/2020 |
| JP | 2021-071969 A | 5/2021 |
| WO | 2017/077598 A1 | 5/2017 |
| WO | 2019/008703 A1 | 1/2019 |

OTHER PUBLICATIONS

English Translation of JP2009175814A Title: Vehicle Driving Support Device Author: Fukuda Masahiro Date: Aug. 9, 2009 (Year: 2009).*

Office Action dated Jun. 24, 2025 from corresponding Japanese Application No. 2021-201959, 5 pages.

* cited by examiner

FIG. 2

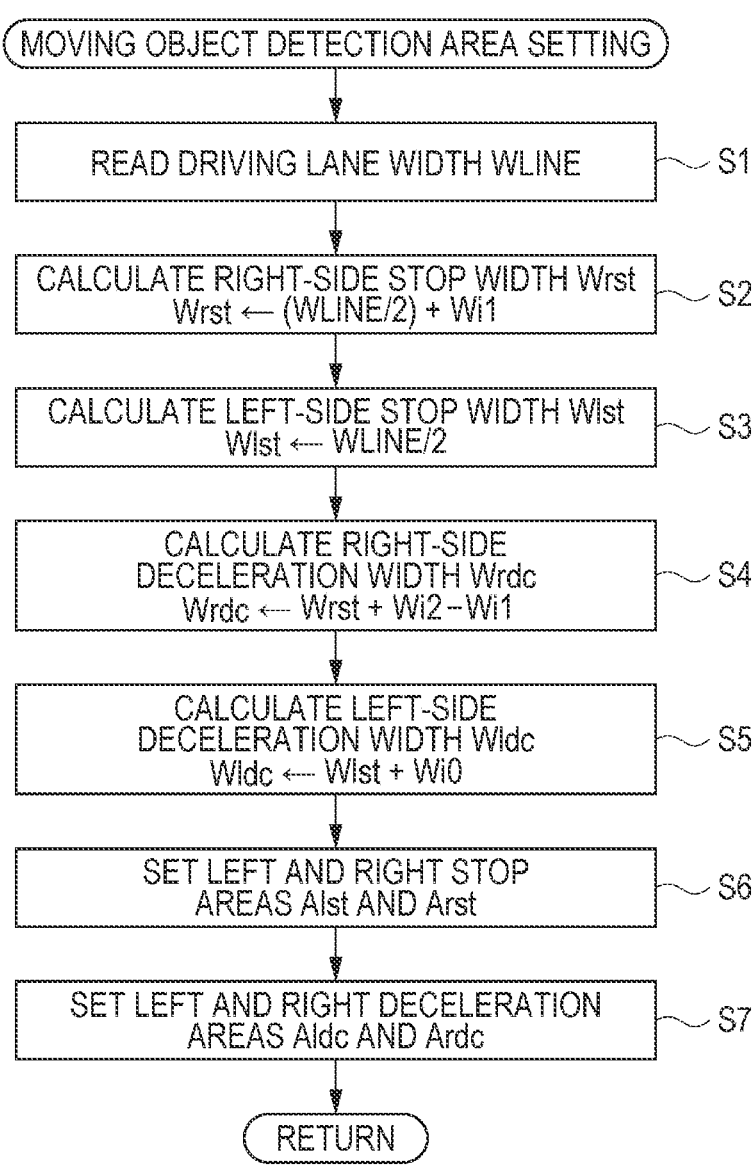

MOVING OBJECT DETECTION AREA SETTING

READ DRIVING LANE WIDTH WLINE ~ S1

CALCULATE RIGHT-SIDE STOP WIDTH Wrst
Wrst ← (WLINE/2) + Wi1 ~ S2

CALCULATE LEFT-SIDE STOP WIDTH Wlst
Wlst ← WLINE/2 ~ S3

CALCULATE RIGHT-SIDE
DECELERATION WIDTH Wrdc
Wrdc ← Wrst + Wi2 − Wi1 ~ S4

CALCULATE LEFT-SIDE
DECELERATION WIDTH Wldc
Wldc ← Wlst + Wi0 ~ S5

SET LEFT AND RIGHT STOP
AREAS Alst AND Arst ~ S6

SET LEFT AND RIGHT DECELERATION
AREAS Aldc AND Ardc ~ S7

RETURN

FIG. 3

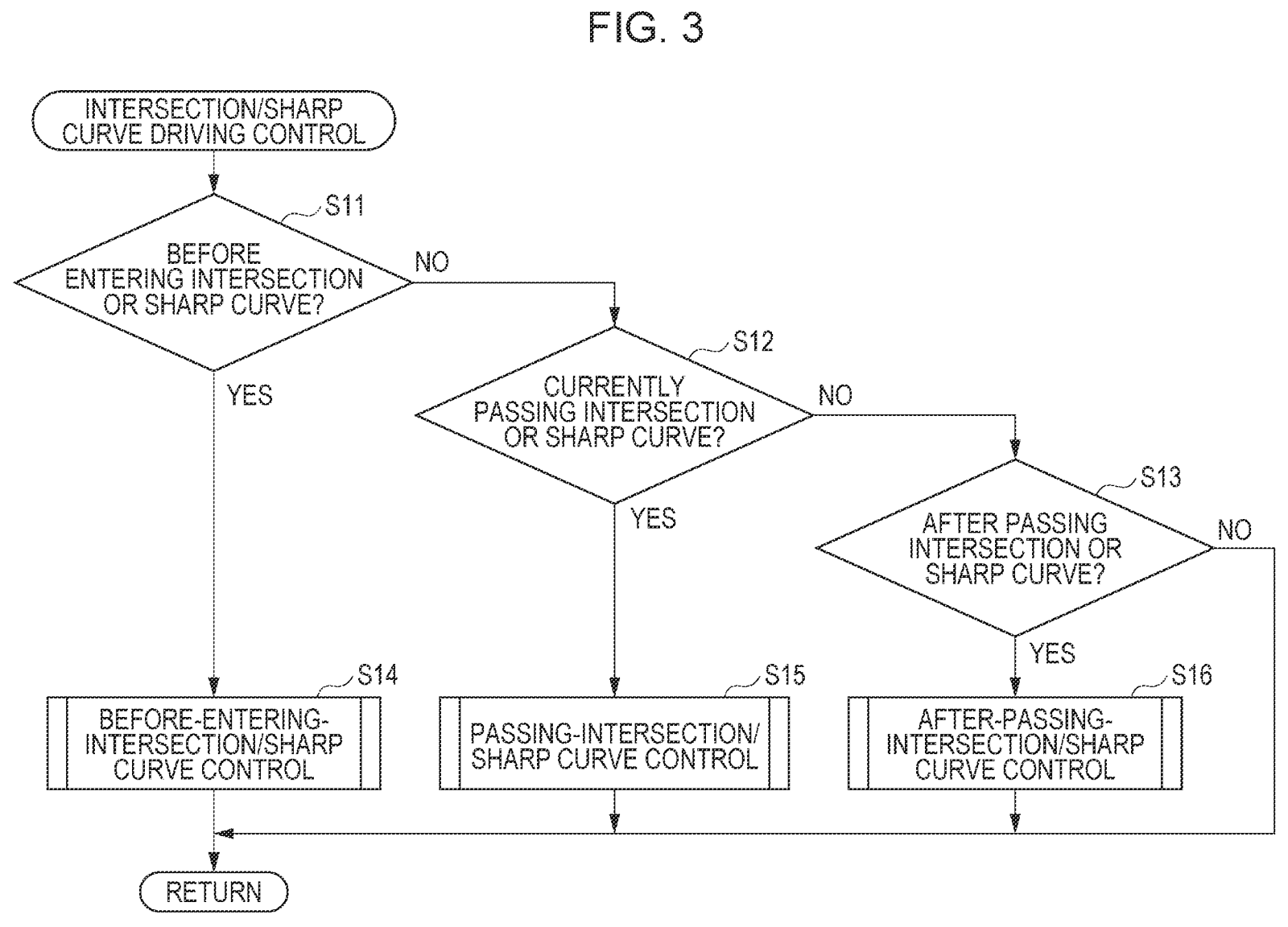

INTERSECTION/SHARP
CURVE DRIVING CONTROL

S11

BEFORE
ENTERING INTERSECTION
OR SHARP CURVE?

NO

YES

S12

CURRENTLY
PASSING INTERSECTION
OR SHARP CURVE?

NO

YES

S13

AFTER PASSING
INTERSECTION OR
SHARP CURVE?

NO

YES

S14

BEFORE-ENTERING-
INTERSECTION/SHARP
CURVE CONTROL

S15

PASSING-INTERSECTION/
SHARP CURVE CONTROL

S16

AFTER-PASSING-
INTERSECTION/SHARP
CURVE CONTROL

RETURN

DRIVE ASSIST APPARATUS FOR TRACKING MOVING OBJECTS TEMPORARILY OBSCURED BY NEARBY STATIONARY OBJECTS

CROSS-REFERENCE TO RELATED APPLICATIONS

The present application claims priority from Japanese Patent Application No. 2021-201959 filed on Dec. 13, 2021, the entire contents of which are hereby incorporated by reference.

BACKGROUND

The disclosure relates to a drive assist apparatus configured to maintain the data of a moving object that is about to cross the roadway even in the case where the moving object is lost, hidden behind a stationary object between the moving object and a vehicle.

There has been known a drive assist apparatus that, when a driver (operator) who drives a vehicle sets a destination, sets a driving route from the current location to the destination, and, in an autonomous driving area, allows the vehicle to autonomously drive in place of the driver. In drive assist based on autonomous driving on general roads, the driving environment ahead of the vehicle is recognized by a sensing device such as a camera, and whether there are preceding vehicles, the lit color of traffic lights, a direction indicated by an arrow traffic light, and so forth are monitored at all times.

In the case where a preceding vehicle is detected ahead in the driving direction of the vehicle, the vehicle speed of the vehicle is controlled in a certain manner based on the distance and relative speed to the preceding vehicle, and so forth. Meanwhile, in the case where the indication (lit color) of traffic lights installed at an intersection is green (green signal), or, even when the indication of the traffic lights is red (red signal), if a direction indicated by an arrow traffic light is the driving direction of the vehicle, the vehicle is allowed to enter the intersection and drive along a target course set along the driving route, such as driving straight or turning left or right.

At that time, for example, as disclosed in Japanese Unexamined Patent Application Publication (JP-A) No. 2010-79425, there has also been known technology for allowing, in the case where a moving object such as a pedestrian who is crossing a pedestrian crossing is detected on the basis of information from a sensing device, a vehicle to automatically stop just before the moving object.

In addition, in the case of autonomous driving, while the vehicle is driving along a target course, in response to detection of a moving object waiting on the sidewalk to cross the driving lane, control is performed to cause the vehicle to slow down just before the moving object, and to pass in front of the moving object at a speed at which the vehicle can stop safely.

SUMMARY

An aspect of the disclosure provides a drive assist apparatus including a driving environment information obtaining unit, a target course setter, an object recognizer, an object detection area setter, and a driving control arithmetic unit. The driving environment information obtaining unit is configured to obtain driving environment information ahead of a vehicle. The target course setter is configured to set a target course for autonomous driving set ahead of the vehicle. The object recognizer is configured to recognize, based on the driving environment information, a moving object and a stationary object that are on a sidewalk. The object detection area setter is configured to set an object detection area for detecting the moving object ahead of the vehicle. The driving control arithmetic unit is configured to control a driving state of the vehicle in a case where the moving object is detected in the object detection area. The driving control arithmetic unit includes a before-entering-sharp-curvature controller and a passing-sharp-curvature controller. The passing-sharp-curvature controller includes a lost determiner and a lost retention time setter. The lost determiner is configured to determine whether, due to movement of the vehicle, the moving object on the sidewalk corresponding to a sharp curvature position that changes with a sharp curvature of the target course is lost by overlapping with the stationary object closer to the vehicle than the moving object. The lost retention time setter is configured to set, in a case where it is determined that the moving object is lost, a lost retention time for retaining data of the moving object to be longer. The passing-sharp-curvature controller includes a passing speed setter configured to set, in a case where the lost retention time is set longer, a passing speed when the vehicle passes the sharp curvature position of the target course to a value less than a speed set in a case where there is no change in the lost retention time.

An aspect of the disclosure provides a drive assist apparatus including circuitry. The circuitry is configured to obtain driving environment information ahead of a vehicle. The circuitry is configured to set a target course for autonomous driving set ahead of the vehicle. The circuitry is configured to recognize, based on the driving environment information, a moving object and a stationary object that are on a sidewalk. The circuitry is configured to set an object detection area for detecting the moving object ahead of the vehicle. The circuitry is configured to, upon detecting the moving object in the object detection area, control a driving state of the vehicle. The circuitry is configured to determine whether, due to movement of the vehicle, the moving object on the sidewalk corresponding to a sharp curvature position that changes with a sharp curvature of the target course is lost by overlapping with the stationary object closer to the vehicle than the moving object. The circuitry is configured to, upon determining that the moving object is lost, set a lost retention time for retaining data of the moving object to be longer, and set a passing speed when the vehicle passes a sharp curvature position of the target course to a value less than a speed set in a case where there is no change in the lost retention time.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to describe the principles of the disclosure.

FIG. 2 is a flowchart illustrating a moving object detection area setting routine;

FIG. 3 is a flowchart illustrating an intersection/sharp curve driving control routine;

DETAILED DESCRIPTION

Figure 11A:
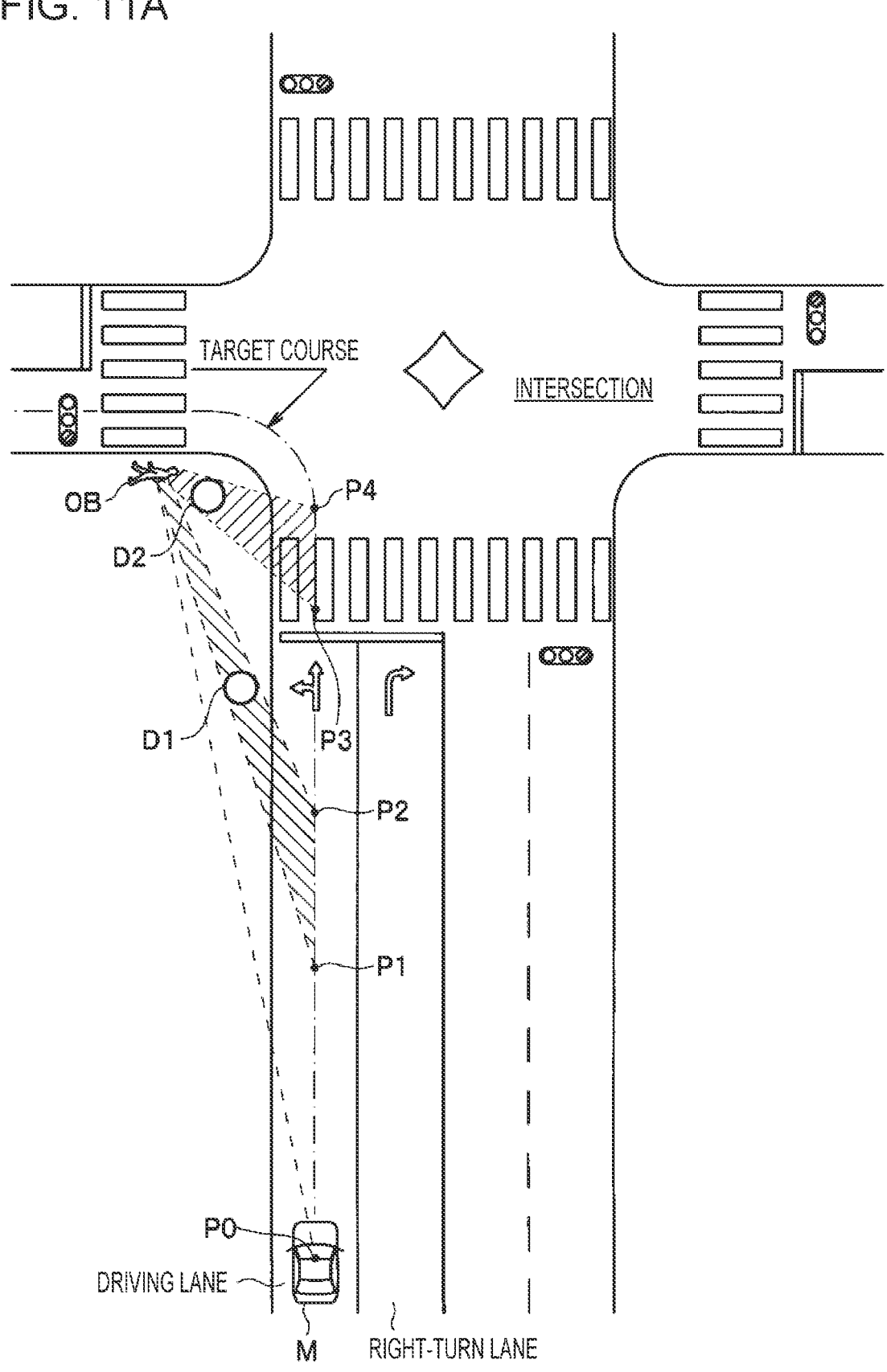
FIG. 11A is a bird's-eye view illustrating a state in which a moving object that is about to cross a driving lane just before an intersection is recognized.

As disclosed in JP-A No. 2010-79425, a moving object that is about to cross a driving lane is detected by a sensing device such as an on-board camera mounted in a vehicle M. As illustrated in FIG. 11A, as the vehicle M approaches a moving object OB, the direction in which the sensing device recognizes the moving object OB gradually changes. Therefore, even when the sensing device recognizes the moving object OB at a moving point P0, if there is a three-dimensional object D1 such as a utility pole between the vehicle M and the moving object OB, at the time the vehicle M passes the points P1 and P2, the moving object OB is hidden behind the three-dimensional object D1, which in turn switches the target being recognized by the sensing device to the three-dimensional object D1.

Figure 11B:
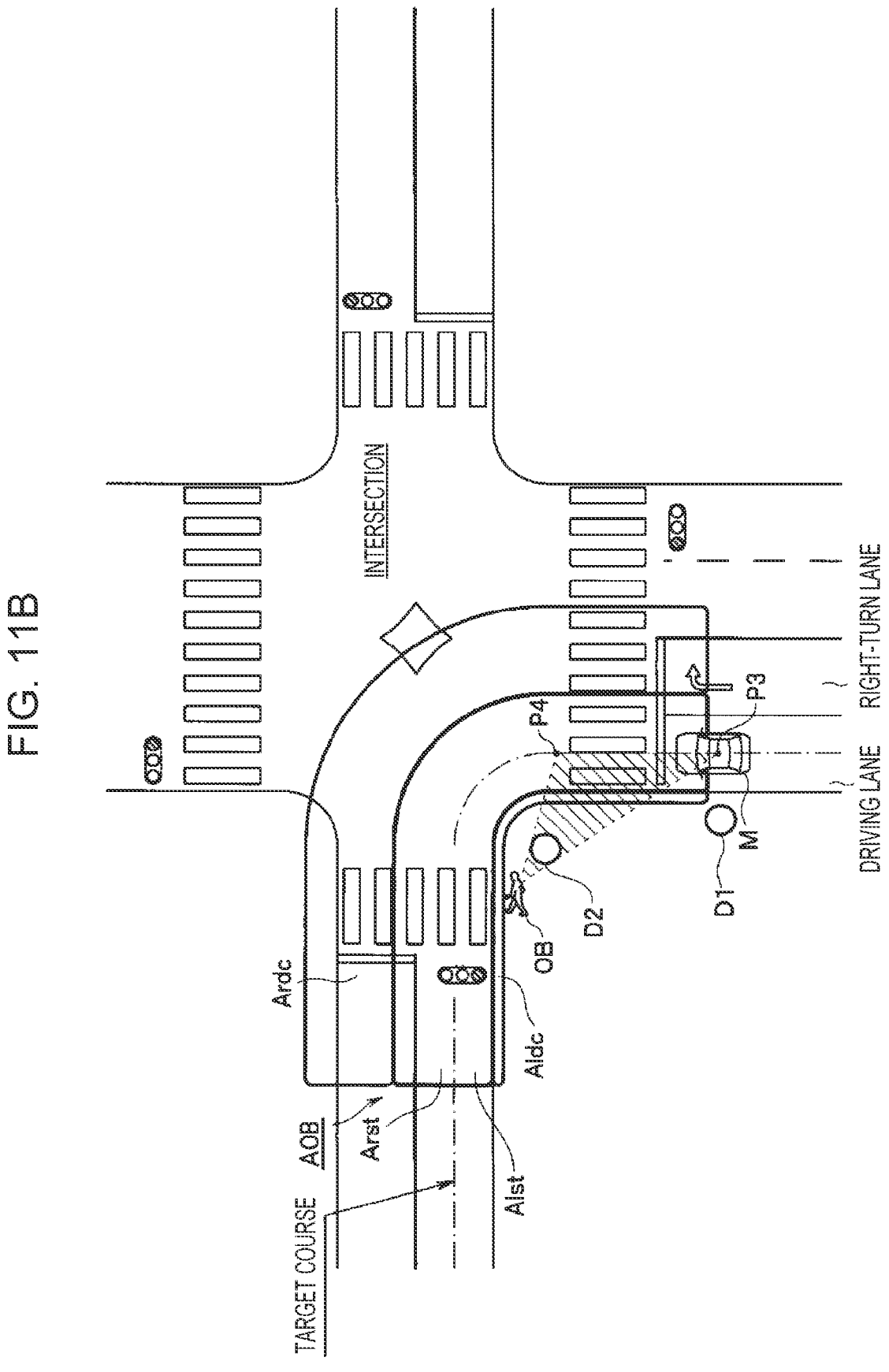
FIG. 11B is a bird's-eye view illustrating a state in which the moving object about to cross the driving lane is lost.
Figure 11C:
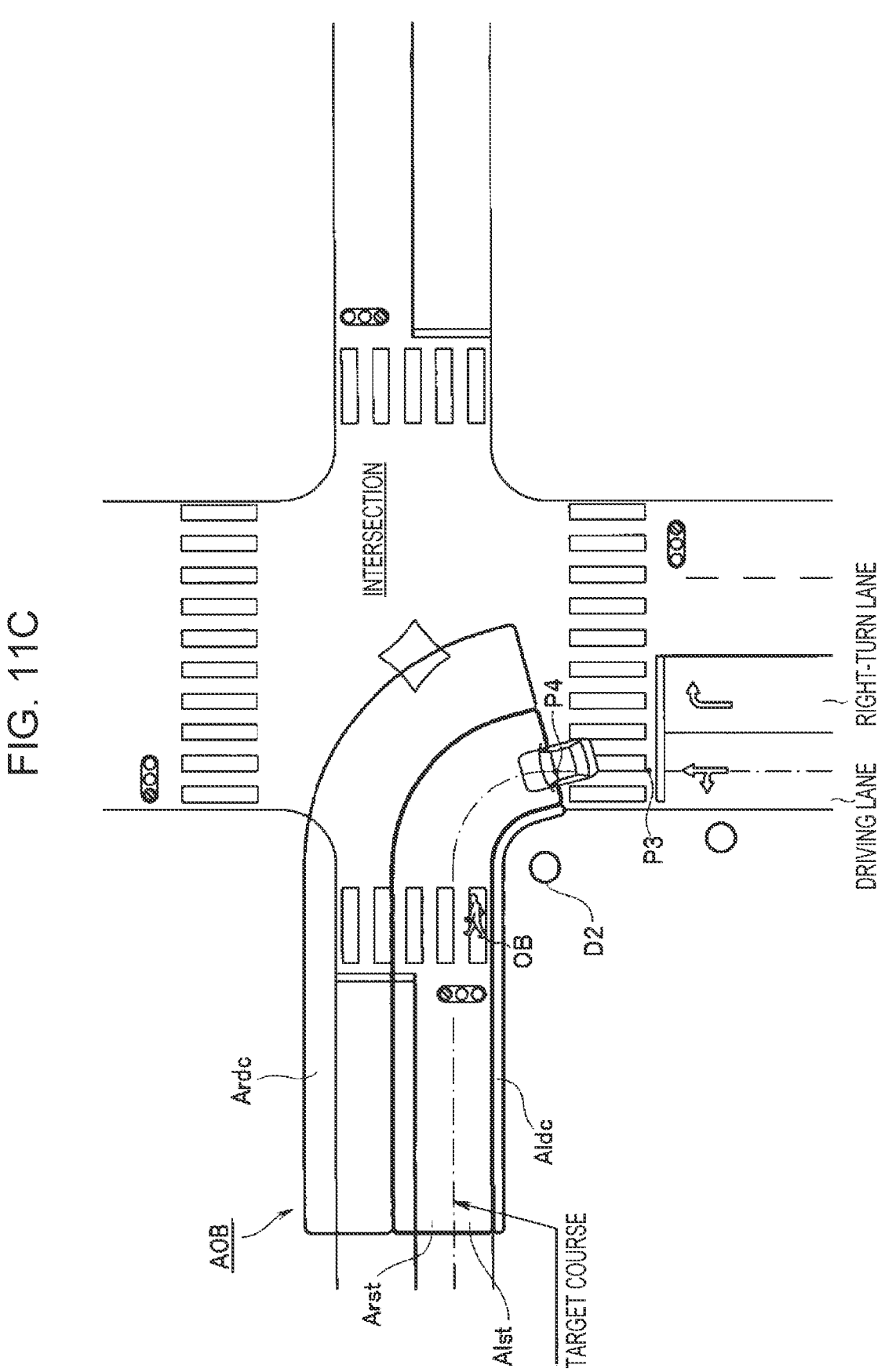
FIG. 11C is a bird's-eye view illustrating a state in which the moving object about to cross the driving lane is recognized again.

As a result, the moving object OB is lost, and as illustrated in FIG. 11C, at the time the vehicle M is about to turn left on a left-hand traffic road by autonomous driving, if the sensing device again detects the moving object OB about to cross the driving lane, the autonomous driving stops the vehicle M suddenly. When the vehicle M stops suddenly, this causes the driver who is driving the vehicle M to panic and feel uncomfortable.

It is desirable to provide a drive assist apparatus configured not to cause a driver who drives a vehicle to panic or to feel uncomfortable even in the case where a moving object that is about to cross a lane where the vehicle is driving is lost while moving and is again recognized afterwards.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Note that the present embodiment will be described on the assumption that roads are left-hand traffic roads. Therefore, in the case of right-hand traffic regulations, the present embodiment is applied by reversing left and right.

Figure 1:
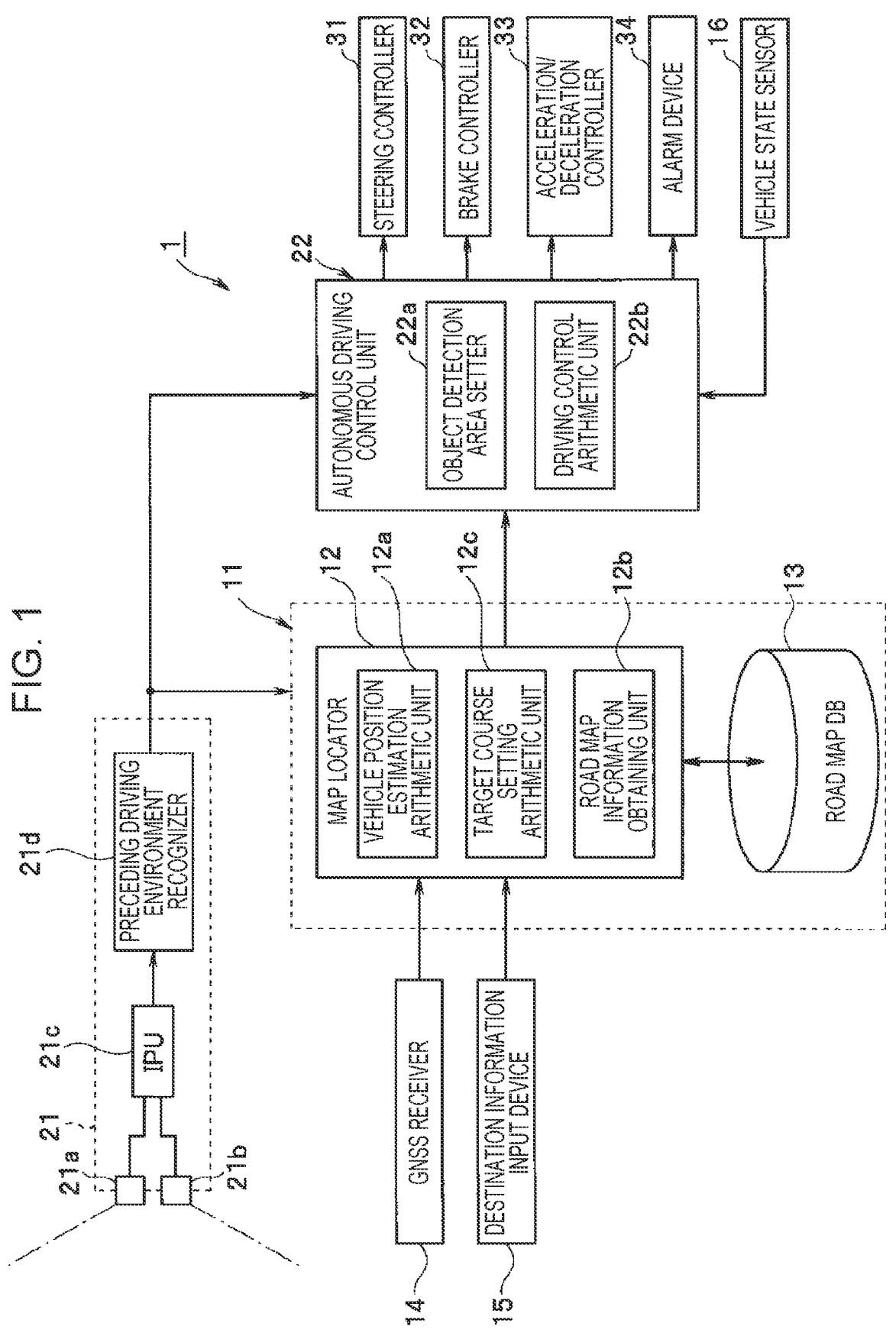
FIG. 1 is a schematic configuration diagram of a drive assist apparatus.
Figure 8A:
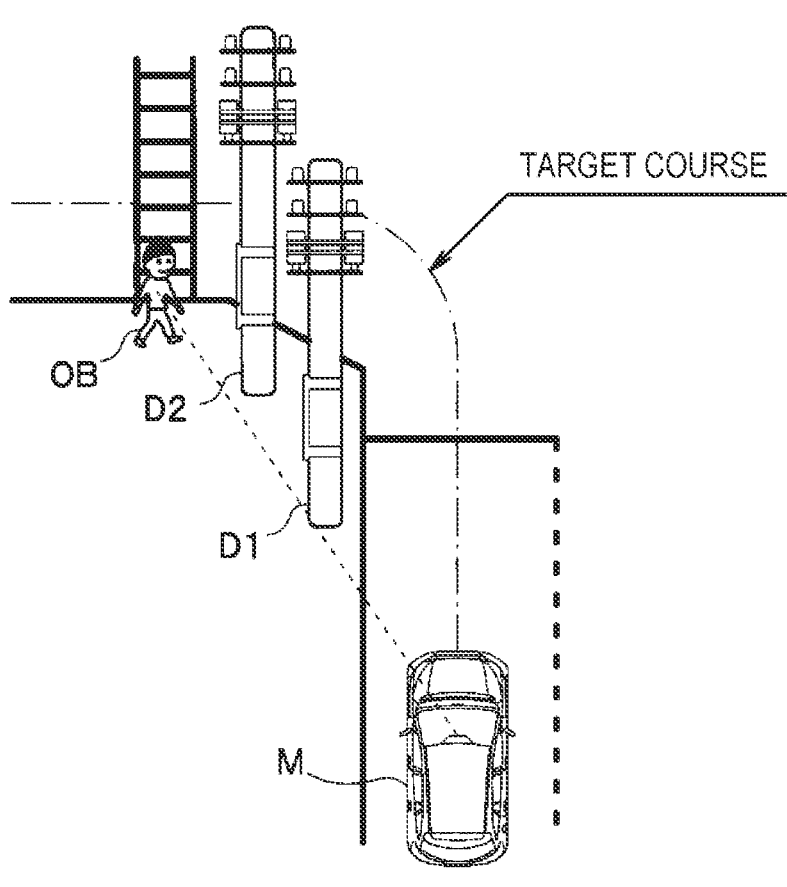
FIG. 8A is a bird's-eye view illustrating a state in which a sensing device recognizes a moving object that is about to cross a driving lane.
Figure 8B:
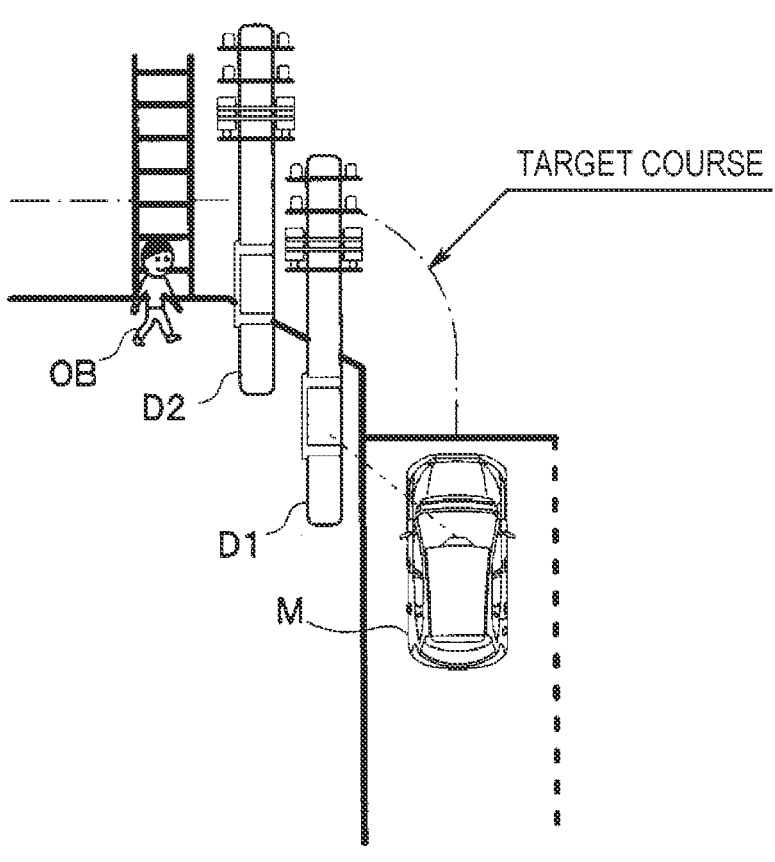
FIG. 8B is a bird's-eye view illustrating a state in which the sensing device temporarily loses the moving object about to cross the driving lane.
Figure 8C:
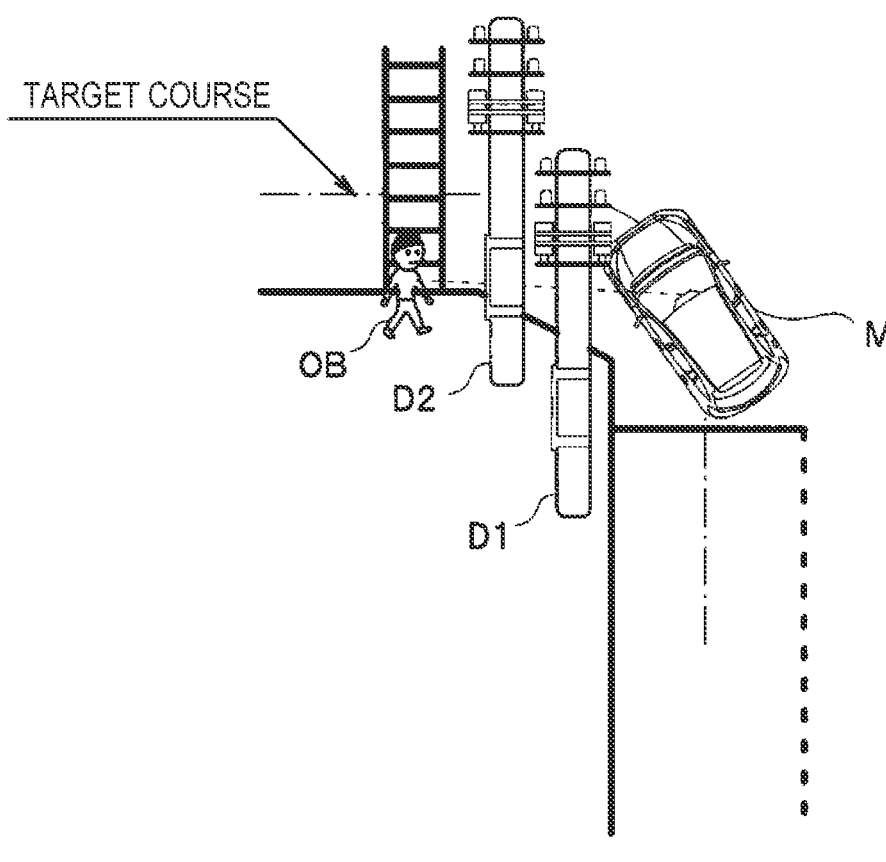
FIG. 8C is a bird's-eye view illustrating a state in which the sensing device again recognizes the moving object about to cross the driving lane.

A drive assist apparatus 1 illustrated in FIG. 1 is mounted in the vehicle M (see FIGS. 8A to 8C, etc.). The drive assist apparatus 1 includes a locator unit 11, a camera unit 21, and an autonomous driving control unit 22. In one embodiment, the camera unit 21 may serves as a "driving environment information obtaining unit".

The locator unit 11 estimates the position (vehicle position) of the vehicle M on a road map, and obtains road map data around the vehicle position. Meanwhile, the camera unit 21 obtains driving environment information ahead of the vehicle M to recognize lane markings that separate a lane (driving lane) where the vehicle M is driving, road shapes, pedestrian crossings, preceding vehicles, and moving objects such as pedestrians and bicycles, and obtains the road curvature at the center of the lane markings, the distance and relative speed to the preceding vehicle, and so forth.

The locator unit 11 includes a map locator arithmetic unit 12 and a high-precision road map database 13. The map locator arithmetic unit 12, a later-described preceding driving environment recognizer 21*d*, and the autonomous driving control unit 22 are formed of a microcontroller that includes a central processing unit (CPU), random-access memory (RAM), read-only memory (ROM), rewritable non-volatile memory (flash memory or electronically erasable programmable read-only memory (EEPROM)), and a peripheral device. The ROM stores programs and fixed data necessary for the CPU to execute processes. The RAM is provided as a work area for the CPU, where various types of data used in the CPU are stored. Note that the CPU is also called a microprocessor (MPU) or a processor. Meanwhile, a graphics processing unit (GPU) or a graph streaming processor (GSP) may be used in place of the CPU. Alternatively, the CPU, GPU, and GSP may be selectively combined and used.

In addition, a Global Navigation Satellite System (GNSS) receiver 14 and a destination information input device 15 are connected to the input side of the map locator arithmetic unit 12. The GNSS receiver 14 receives positioning signals transmitted from positioning satellites. Meanwhile, when the driver who is the operator inputs destination information (address, phone number, selection from a list of registered destinations displayed on a monitor, etc.), the destination information input device 15 obtains corresponding position coordinates (longitude and latitude), and sets the position coordinates as the destination.

The map locator arithmetic unit 12 includes a vehicle position estimation arithmetic unit 12a, a road map information obtaining unit 12b, and a target course setting arithmetic unit 12c. In one embodiment, the target course setting arithmetic unit 12c may serve as a "target course setter". The vehicle position estimation arithmetic unit 12a obtains position coordinates (longitude and latitude) which are the position information of the vehicle M on the basis of the positioning signals received by the GNSS receiver 14.

The road map information obtaining unit 12b performs map matching between the position coordinates of the vehicle M and the position coordinates (longitude and latitude) of the destination set by the destination information input device 15 on a road map stored in the high-precision road map database 13. The road map information obtaining unit 12b identifies both positions, and transmits road map information from the current vehicle position to the surroundings of the destination to the target course setting arithmetic unit 12c. The high-precision road map database 13 is a large-capacity storage medium such as a hard disk drive (HDD), and stores highly precise road map information (dynamic maps). The high-precision road map information holds lane data (lane width data, lane center position coordinate data, lane driving azimuth data, speed limit, etc.) necessary for performing autonomous driving.

The target course setting arithmetic unit 12c first generates a driving route connecting the current position and the destination, which are map-matched by the road map information obtaining unit 12b, on the road map. Next, the target course setting arithmetic unit 12c sequentially sets and updates a target course (driving straight, turning left or right from an intersection, a driving lane such as the left lane, center lane, or right lane in the case of a straight road, the horizontal position within the lane, etc.), which is the driving direction for allowing the vehicle M to autonomously drive, for hundreds to several kilometers ahead of the vehicle M. Note that information of the target course is read by the autonomous driving control unit 22.

In contrast, the camera unit 21 is fixed in the upper center of the front part of the compartment of the vehicle M. The camera unit 21 includes on-board cameras (stereo cameras) including a main camera 21a and a sub-camera 21b, an image processing unit (IPU) 21c, and the preceding driving environment recognizer 21d. Both the cameras 21a and 21b are disposed at symmetrical positions with respect to the center in the vehicle width direction with a certain baseline length. Both the cameras 21a and 21b are wide-angle cameras, as illustrated by dot-dash lines in FIG. 1, and are capable of imaging a wide range horizontally in the vehicle width direction immediately in front of the vehicle M. Note that both the cameras 21a and 21b may be 360-degree cameras.

In the camera unit 21, driving environment image information obtained by imaging, by both the cameras 21a and 21b, a certain imaging area ahead of the vehicle M is subjected to certain image processing by the IPU 21c. The preceding driving environment recognizer 21d reads the driving environment image information, which has been image-processed by the IPU 21c, and, on the basis of the driving environment image information, recognizes and obtains the driving environment ahead. The to-be-obtained driving environment information ahead includes the road shape (road curvature [1/m] at the center of lane markings that separate the left and right, and the width between the left and right lane markings (vehicle width)) of a course (vehicle course) where the vehicle M is driving, intersections, stationary objects such as traffic signs, utility poles, and telegraph poles, moving objects such as pedestrians and bicycles, and the indication (lit color) of traffic lights. Therefore, the preceding driving environment recognizer 21d has the function as an object recognizer.

In this case, the camera unit 21 may be a monocular camera with the main camera 21a alone, and one or a combination of an ultrasonic sensor, a millimeter wave radar, a microwave radar, an infrared sensor, a laser radar, and Light Detection And Ranging (LiDAR) may be adopted in place of the sub-camera 21b, thereby searching a wide area in front of the vehicle M.

The autonomous driving control unit 22 includes a moving object detection area setter 22a and a driving control arithmetic unit 22b. The map locator arithmetic unit 12, the preceding driving environment recognizer 21d of the camera unit 21, and a vehicle state sensor 16 are connected to the input side of the autonomous driving control unit 22. The vehicle state sensor 16 is a collective term for a group of sensors that detect various states regarding the vehicle M. The vehicle state sensor 16 includes a vehicle speed sensor that detects the vehicle speed of the vehicle M (vehicle speed), an acceleration sensor that detects forward/backward acceleration acting on the vehicle M, a yaw rate sensor that detects a yaw rate acting on the vehicle M, and a brake sensor that detects the pressing of a brake pedal.

A steering controller 31, which controls the vehicle M to drive along the target course, a brake controller 32, which controls the vehicle M to decelerate by forced braking, an acceleration/deceleration controller 33, which controls the output of drive sources (engines, motors, etc.) mounted in the vehicle M, and an alarm device 34 are connected to the output side of the autonomous driving control unit 22.

The moving object detection area setter 22a reads the target course where the vehicle M is currently driving, which has been set by the target course setting arithmetic unit 12c of the map locator arithmetic unit 12, and obtains a driving lane width WLINE on the target course from the high-precision road map database 13. Note that the driving lane width WLINE may be obtained from the driving environment of the vehicle M imaged by the camera unit 21.

Figure 10:
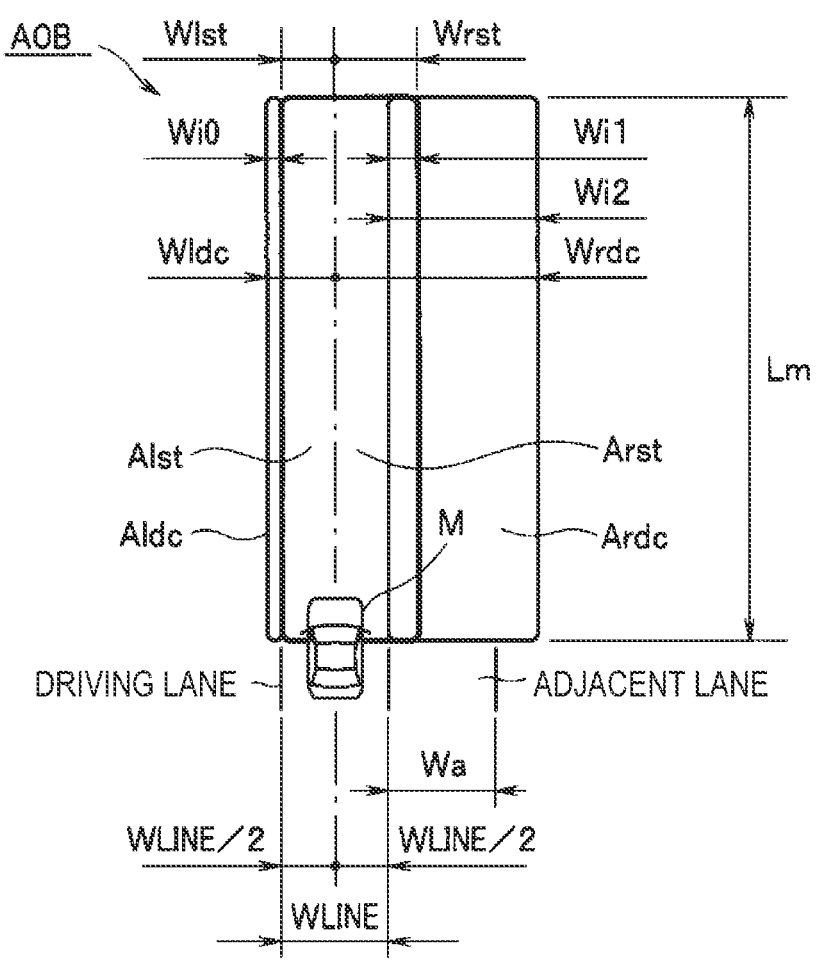
FIG. 10 is a bird's-eye view illustrating a moving object detection area set to a driving lane with an adjacent lane on the right side.

On the basis of the driving lane width WLINE, a moving object detection area AOB is set to a course length Lm (such as 20 to 40 [m]) from the vehicle M along the target course in accordance with the driving lane width WLINE and an adjacent lane width Wa (see FIG. 10). Note that the moving object detection area AOB will be described in detail later.

The driving control arithmetic unit 22b checks whether a moving object OB is detected in the moving object detection area AOB set by the moving object detection area setter 22a, and, in the case where a moving object OB is detected in the moving object detection area AOB, controls the driving state of the vehicle M in accordance with the position relationship between the vehicle M and the moving object OB. Note that, in the present embodiment, the moving object OB is limited to a moving object permitted to move on sidewalks, such as a pedestrian or a bicycle. The moving object OB is recognized using template matching or feature detection of the related art, for example, on the basis of environment information read by the preceding driving environment recognizer 21d.

The setting of a moving object detection area AOB by the moving object detection area setter 22a is performed, in one example, in accordance with an external moving object detection area setting routine illustrated in FIG. 2.

In this routine, firstly in step S1, the lane width (driving lane width) WLINE of the current lane where the vehicle M is driving is read. The routine proceeds to step S2, and a right-side stop width Wrst is calculated using the following formula:

$$Wrst \leftarrow (WLINE/2) + Wi1$$

where Wi1 is a first widening amount (shift amount). Therefore, the right-side stop width Wrst is set wider than a left-side stop width Wlst by the first widening amount Wi1.

Note that the first widening amount Wi1, an initial widening amount Wi0, and a later-described second widening amount Wi2 have the relationship Wi2>Wi1>Wi0, and the second widening amount Wi2 is set wider than the width of a lane adjacent to the driving lane of the vehicle M. In the present embodiment, Wi1 is set to about 1 [m], and Wi2 is set to about 5 [m].

Next, in step S3, the left-side stop width Wlst is calculated (Wlst←WLINE/2), and the routine proceeds to step S4. In step S4, a right-side deceleration width Wrdc is calculated on the basis of the right-side stop width Wrst, the first widening amount Wi1, and the second widening amount Wi2 (Wrdc←Wrst+Wi2−Wi1). After that, the routine proceeds to step S5, and a left-side deceleration width Wldc is calculated on the basis of the left-side stop width Wlst and the initial widening amount Wi0 (Wldc←Wlst+Wi0).

In the case where the vehicle M enters the intersection to turn left by autonomous driving along the target course, the vehicle M becomes closer to the pedestrian crossing ahead of the left turn than before entering the intersection. Thus, by setting the right-side deceleration width Wrdc wider, deceleration control can be executed at an early stage in response to detection of a moving object OB.

After that, when the routine proceeds to step S6, the left and right stop areas Alst and Arst are set. As illustrated in FIG. 10, the left and right stop areas Alst and Arst are areas surrounded by the left and right stop widths Wlst and Wrst and the course length Lm set in advance ahead of the vehicle M.

Next, when the routine proceeds to step S7, the routine sets left and right deceleration areas Aldc and Ardc, and exits. As illustrated in FIG. 10, the left and right deceleration areas Aldc and Ardc are areas surrounded by the left and right deceleration widths Wldc and Wrdc and the course length Lm set in advance ahead of the vehicle M, from which overlapping areas with the left and right stop areas Alst and Arst set in step S6 are excluded. The left deceleration area Aldc is set to the left side of the driving lane width WLINE with the width of the initial widening amount Wi0. In contrast, the right deceleration area Ardc is set at a position moved from the right side of the driving lane width WLINE by the first widening amount Wi1, with the width of the difference (Wi2−Wi1).

Figure 12:
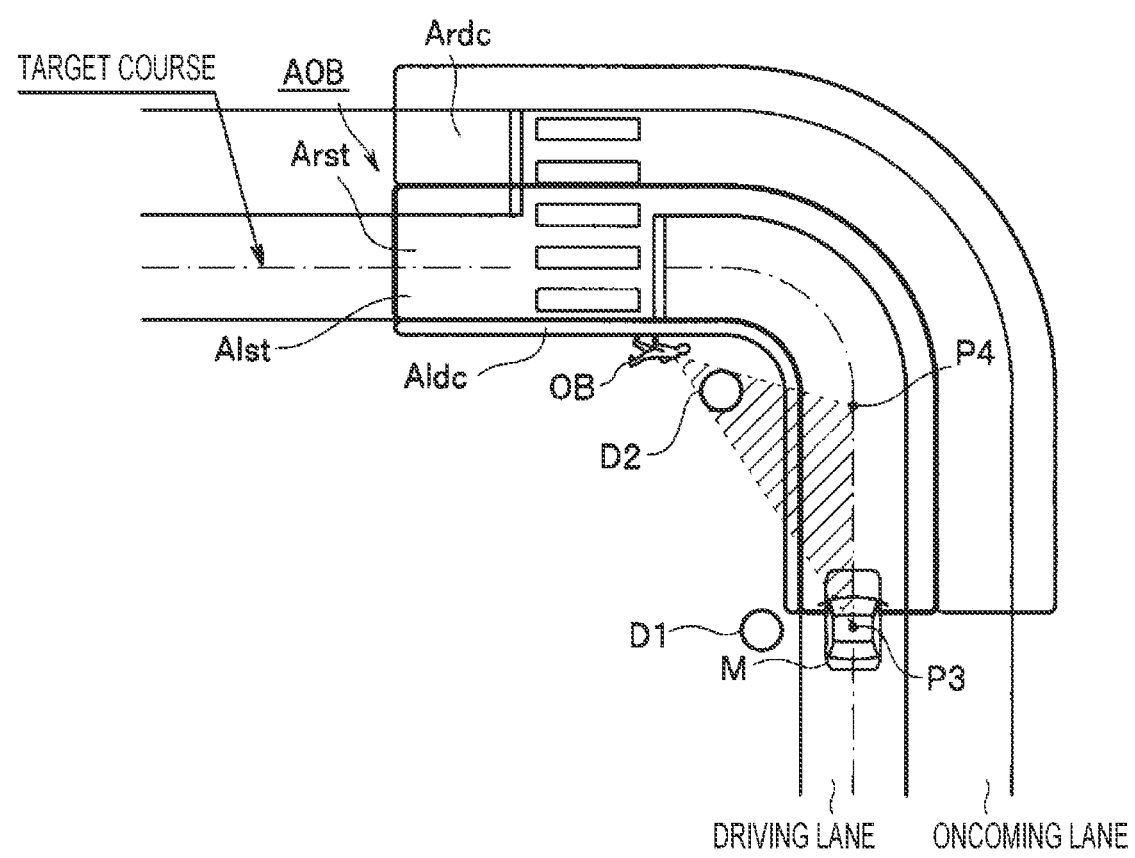
FIG. 12 is a bird's-eye view illustrating a state in which a moving object that is about to cross a sharply curved driving lane is lost.

In this case, if a moving object (pedestrian, bicycle, etc.) OB that is about to cross the pedestrian crossing ahead of the left turn is detected in the deceleration area Aldc or Ardc, the autonomous driving control unit 22 decelerates the speed of the vehicle M when passing the pedestrian crossing to a slow speed. Moreover, if the moving object OB moving on the pedestrian crossing is detected in the stop area Alst or Arst, the autonomous driving control unit 22 executes stop control. The detection of a moving object (pedestrian, bicycle, etc.) OB in the moving object detection area AOB is applied to, besides the intersection to turn left, a sharp curve in a straight road as illustrated in FIG. 12 if the target course set by the target course setting arithmetic unit 12*c* changes with a sharp curvature. In this case, whether the target course has a sharp curve is determined based on a change in road curvature. In this case, it is determined that the target course has a sharp curve if the road curvature is greater than or equal to a predetermined sharp curvature determination value. Note that sharp curves include not only general roads but also rotary roads provided in front of stations or circular intersections (roundabouts).

By the way, as illustrated in FIG. 11A, the direction in which the camera unit 21 mounted in the vehicle M recognizes a moving object (pedestrian in FIG. 11A) OB waiting on the sidewalk to cross the pedestrian crossing ahead of the left turn moves as the vehicle M approaches the intersection. In this case, when three-dimensional objects D (D1 and D2 in FIG. 11A), which serve as stationary objects such as a utility pole and a telegraph pole, are erected on a side closer to the vehicle M than the moving object OB is, the moving object OB is recognized at the moving point P0, which is relatively far from the three-dimensional objects D (D1 and D2); however, the moving object OB is lost, hidden behind the three-dimensional objects D (D1 and D2), at the moving points P1 and P2, which are relatively close to the three-dimensional object D1, and at moving points P3 and P4, which are relatively close to the three-dimensional object D2. Note that the term "lost" means that the moving object OB, which is a target being recognized based on an image captured by the camera unit 21, is unrecognizable, hidden behind the three-dimensional objects D1 and/or D2, which are closer to the vehicle M.

Figure 9A:
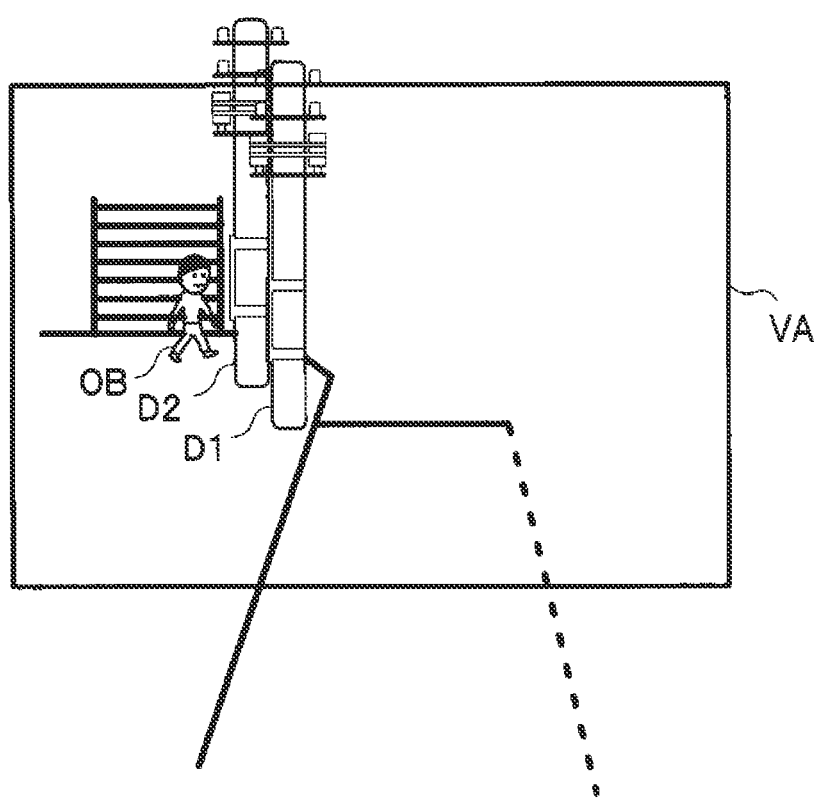
FIG. 9A is a camera image indicating a state in which a moving object that is about to cross a driving lane is recognized.
Figure 9B:
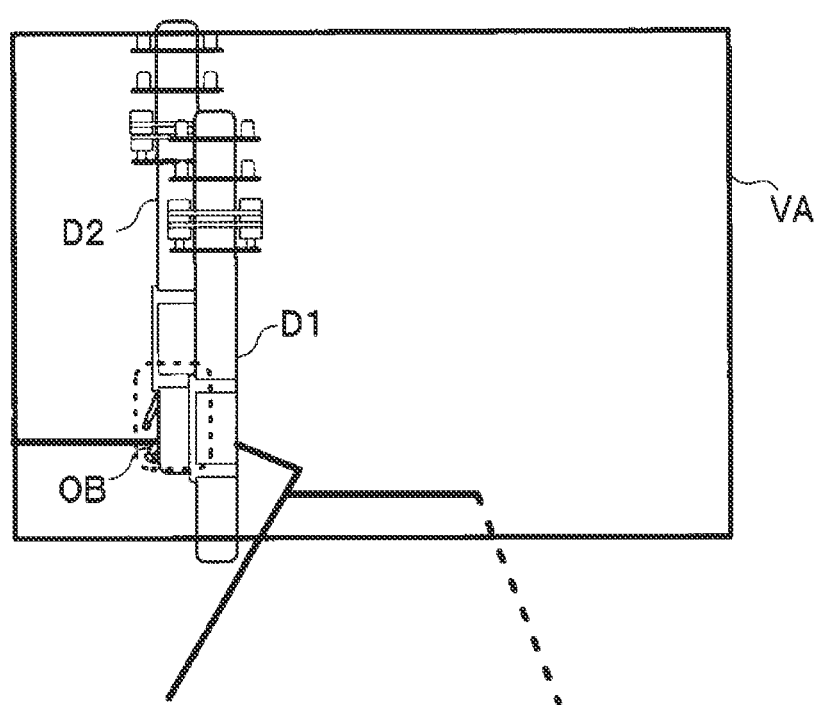
FIG. 9B is a camera image indicating a state in which the moving object about to cross the driving lane is lost.

For example, as illustrated in an image (camera image) VA captured by the camera unit 21 in FIGS. 8B, 11B, and 9B, while the vehicle M which is about to make a left turn is stopped just before the intersection because of a red light, the moving object OB may be hidden behind the three-dimensional object D2 and may be unrecognized by the camera unit 21. Therefore, when the traffic light changes from a red light to a green light, the vehicle M takes off without recognizing the mobile object OB which is about to cross the pedestrian crossing ahead of the left turn.

Figure 9C:
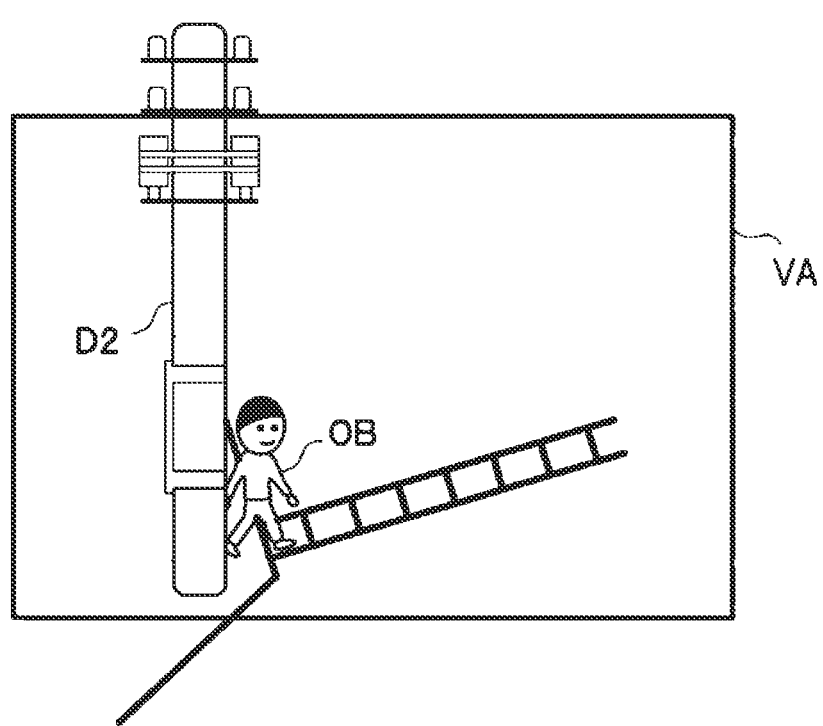
FIG. 9C is a camera image indicating a state in which the moving object about to cross the driving lane is recognized again.

As a result, when the vehicle M approaches the pedestrian crossing ahead of the left turn, as illustrated in the camera image VA in FIGS. 8C, 11C, and 9C, the moving object OB about to cross the pedestrian crossing ahead of the left turn is suddenly recognized by the camera unit 21. In the case where the moving object OB is detected in the stop area Alst ahead of the vehicle M, the vehicle M is stopped suddenly, making the driver panic. This is also the case in which a moving object OB which is lost, hidden behind a three-dimensional object, at a sharp curve suddenly appears in front of the vehicle M in order to cross the pedestrian crossing.

Therefore, the driving control arithmetic unit 22*b* stores the data of a moving object OB, which is recognized before the moving object OB hides in the shadow of a three-dimensional object, even in a state where the moving object OB is hidden behind the three-dimensional object, thereby allowing the vehicle M to drive at a speed at which the vehicle M can be stopped safely even in the case where the moving object OB appears in front of the vehicle M.

Driving control at an intersection or a sharp curve by the driving control arithmetic unit 22*b* is executed, in one example, in accordance with an intersection/sharp curve driving control routine illustrated in FIG. 3.

In this routine, firstly in step S11, the target course setting arithmetic unit 12*c* determines whether the vehicle M is entering an intersection to make a left turn or is entering a sharp curve depending on whether a change in curvature of a target course set in front of the vehicle M is greater than or equal to a preset sharp curvature change.

Here, a distance before entering an intersection or a sharp curve, based on which it is determined whether the vehicle M is entering an intersection to make a left turn or entering a sharp curve, is examined based on the section (Lm+α), which is obtained by adding the length driven Lm on the target course set by the target course setting arithmetic unit 12c of the map locator arithmetic unit 12 and a preceding length a of several [m] to several tens of [m].

Then, if it is determined that the vehicle M is before entering an intersection or a sharp curve, the routine proceeds to step S14, executes before-entering-intersection/sharp curve control, and exits. Processing in the before-entering-intersection/sharp curve control corresponds to a before-entering-sharp-curvature controller of the disclosure.

If it is determined that the current position of the vehicle M is not before entering an intersection or a sharp curve, the routine branches to step S12. In step S12, it is determined whether the current position of the vehicle M is currently passing an intersection or a sharp curve.

If it is determined that the vehicle M is currently passing an intersection or a sharp curve, the routine proceeds to step S15, executes passing-intersection/sharp curve control, and exits. Note that processing in the passing-intersection/sharp curve control corresponds to a passing-sharp-curvature controller of the disclosure.

If it is determined that the current position of the vehicle M is not currently passing an intersection or a sharp curve, the routine branches to step S13. In step S13, it is determined whether the current position of the vehicle M is after passing an intersection or a sharp curve. If it is determined that a certain amount of time (a few [sec]) has elapsed after passing an intersection or a sharp curve, the routine proceeds to step S16, executes after-passing-intersection/sharp curve control, and exits. Note that processing in step S16 corresponds to an after-passing-sharp-curvature controller of the disclosure.

If the vehicle M is not after passing an intersection or a sharp curve, the routine exits. Whether the vehicle M is entering, currently passing, or after passing an intersection or a sharp curve is determined on the basis of a preceding driving environment recognized by the preceding driving environment recognizer 21d of the camera unit 21 or road map information obtained by the road map information obtaining unit 12b.

That is, in FIG. 11A, the state in which the vehicle M is driving in a straight direction along the target course is the state before entering an intersection or a sharp curve. Next, the state in which the orientation of the vehicle M is changed along the target course is the state in which the vehicle M is currently passing the intersection or the sharp curve. Thereafter, the state in which the orientation of the vehicle M is along the target course and the vehicle M proceeds in a straight direction again is the state in which the vehicle M is after passing the intersection or the sharp curve. Therefore, whether the vehicle M is before entering, currently passing, or after passing an intersection or a sharp curve may be determined on the basis of a steering angle detected by a steering angle sensor or a yaw rate detected by the yaw rate sensor. Before-entering-intersection/sharp curve control.

Figure 4:
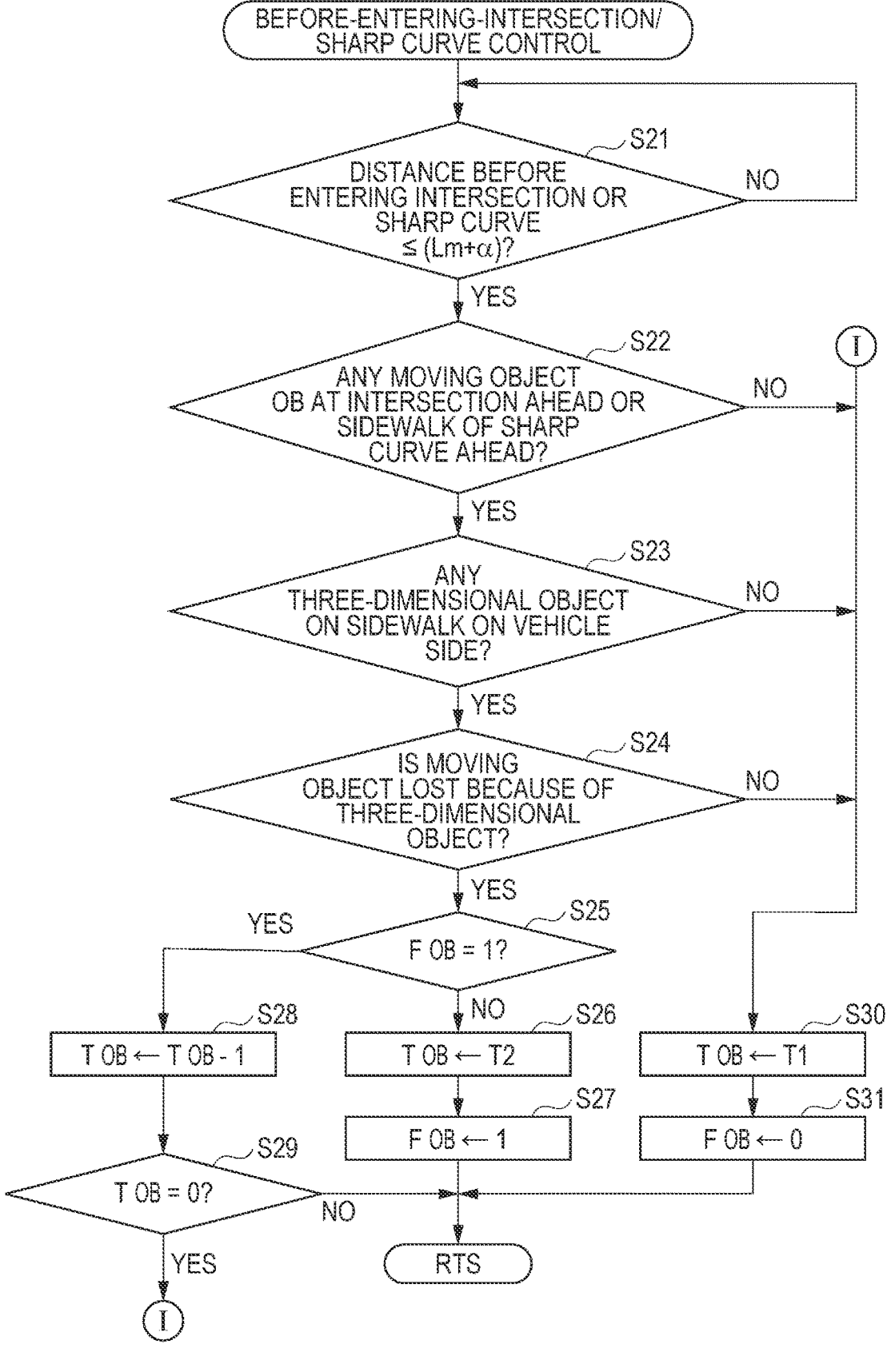
FIG. 4 is a flowchart illustrating a before-entering-intersection/sharp curve control routine.

The before-entering-intersection/sharp curve control in step S14 described above is executed in accordance with a before-entering-intersection/sharp curve control subroutine illustrated in FIG. 4. In this subroutine, firstly in step S21, it is examined whether the distance before entering an intersection or a sharp curve is within the preset distance (Lm+α)

ahead of the vehicle M. Then, the routine waits until the distance from the vehicle M to the entrance of an intersection or a sharp curve reaches the section (Lm+α). Then, after the before-entering distance reaches the section (Lm+α) (before-entering distance≤Lm+α), the routine proceeds to step S22.

In step S22, whether a moving object OB is recognized at the intersection ahead or on the sidewalk of the sharp curve ahead is examined based on preceding driving environment information recognized by the preceding driving environment recognizer 21d of the camera unit 21. As illustrated in the image VA captured by the camera unit 21 in FIGS. 8A, 11A, and 9A, for example, in the case where the target course of the vehicle M is making a left turn at an intersection, in response to detection of a moving object (pedestrian in the drawings) OB who is on the sidewalk on the left side and who is about to cross the pedestrian crossing ahead of the left turn, the routine proceeds to step S23. If no moving object OB is detected, the routine jumps to step S30.

In step S23, based on the preceding driving environment information recognized by the preceding driving environment recognizer 21d of the camera unit 21, whether there is a three-dimensional object D between the vehicle M and the moving object OB is examined. For example, in FIGS. 8A and 11A, two three-dimensional objects D1 and D2 such as a utility pole and a telegraph pole are detected. In response to detection of a three-dimensional object D, the routine proceeds to step S24. If no three-dimensional object D is detected, the routine jumps to step S30.

In step S24, whether the moving object OB is temporarily lost because of the three-dimensional object D is examined. As illustrated in FIGS. 8A and 11A, as the vehicle M approaches the intersection, the direction in which the camera unit 21 recognizes the moving object OB moves. As a result, the moving object OB is recognized from the moving point P0 to the moving point P1, but, from the moving point P1 to the moving point P2, the three-dimensional object D1 overlaps with the moving object OB, and the moving object OB is lost, hidden behind the three-dimensional object D1. Furthermore, the moving object OB is recognized when the vehicle M passes the moving points P2 and P3, but, from the moving point P3 to the moving point P4, the three-dimensional object D1 overlaps with the moving object OB again and the moving object OB is lost. Note that processing in step S24 corresponds to a lost determiner of the disclosure.

In the case where it is determined in step S24 that the moving object OB is temporarily lost (from the moving point P1 to the moving point P2, or from the moving point P3 to the moving point P4), the routine proceeds to step S25. Meanwhile, in the case where it is determined that the moving object OB is recognized (from P0 to P1, or from P2 to P3), the routine jumps to step S30.

In step S25, reference is made to the value of a temporarily lost determination flag FOB to examine whether the routine is the first routine after the determination that the moving object OB is temporarily lost. Note that the initial value of this temporarily lost determination flag FOB is zero.

In the case where it is determined that the routine is the first routine after the determination that the moving object OB is lost based on FOB=0, the routine proceeds to step S26. In step S26, a lost retention time TOB is set to a retention time T2 (for example, 10 [sec]) (TOB←T2), which is longer than usual. The routine proceeds to step S27, sets the temporarily lost determination flag FOB (FOB←1), and exits. In contrast, in the case where it is determined in step S25 that the routine is the execution of the routine after losing the moving object OB based on FOB=1, the routine proceeds to step S28, decrements the lost retention time TOB (TOB←TOB−1), proceeds to step S29, and examines whether the lost retention time TOB has elapsed.

In the case where the lost retention time TOB continues, the routine exits as it is. Meanwhile, in the case where the lost retention time TOB is reached (TOB=0), the routine proceeds to step S30. Therefore, as illustrated in FIG. 11A, even if the moving object OB is temporarily lost from the moving point P1 to the moving point P2 and from the moving point P3 to the moving point P4, the data of the moving object OB is retained until the lost retention time TOB elapses. In this case, as illustrated in FIG. 11B, if the vehicle M is stopped just before the intersection because the traffic light is a red light, the decrement of the lost retention time TOB in step S28 is stopped until the vehicle M takes off. Note that processing in steps S27 to 29 corresponds to a lost retention time setter of the disclosure.

Moreover, in the case where the routine proceeds to step S30 from any of steps S21 to S24 and S29, the routine sets the lost retention time TOB to a normal retention time T1 (for example, 0.5 [sec]) (TOB←T1), proceeds to step S31, clears the temporarily lost determination flag FOB (FOB←0), and exits.

Passing-Intersection/Sharp Curve Control

Figure 5:
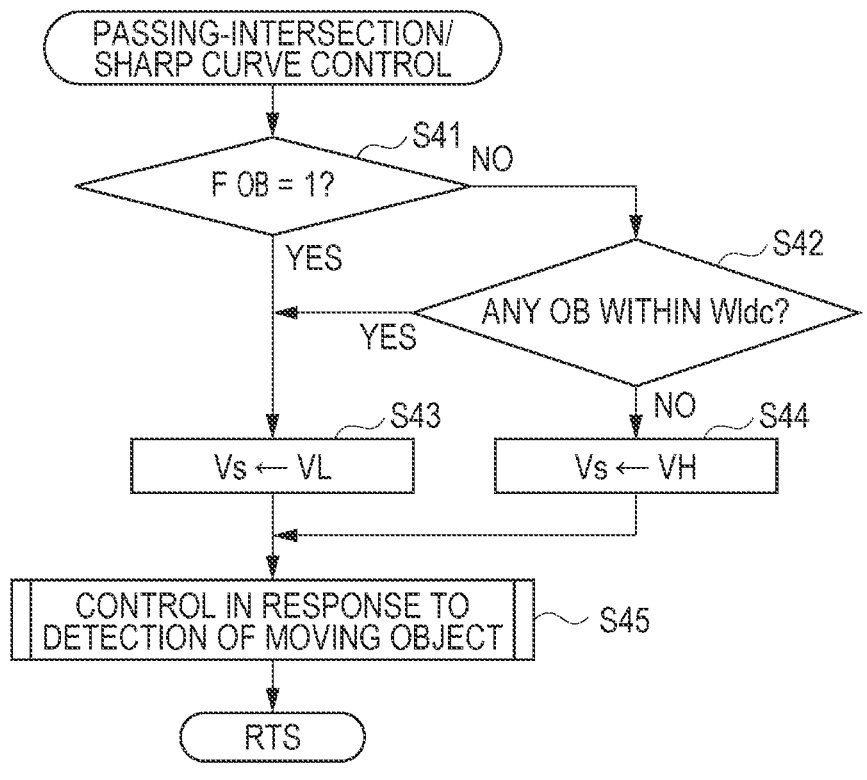
FIG. 5 is a flowchart illustrating a passing-intersection/sharp curve control routine.

The passing-intersection/sharp curve control in step S15 of FIG. 3 is executed in accordance with a passing-intersection/sharp curve control subroutine illustrated in FIG. 5. In this subroutine, firstly in step S41, reference is made to the value of the temporarily lost determination flag FOB set in the before-entering-intersection/sharp curve control subroutine illustrated in FIG. 4.

In the case where it is determined that the moving object OB is temporarily lost based on FOB=1, the routine proceeds to step S43. In contrast, in the case where the moving object OB is recognized based on FOB=0 or no moving object OB is recognized, the routine branches to step S42. In step S42, whether the moving object OB is recognized within the left deceleration width Wldc is examined. Note that the moving object OB is not limited to the above-described temporarily lost moving object OB, and includes all moving objects OB recognized within the left deceleration width Wldc.

In the case where the moving object OB is recognized within the left deceleration width Wldc, the routine proceeds to step S43. In the case where no moving object OB is recognized within the left deceleration width Wldc, the routine proceeds to step S44.

In step S43, the routine sets a passing-intersection/sharp curve speed Vs to a very low speed VL (10 [km/h] or less), and proceeds to step S45. In step S44, the routine sets the passing-intersection/sharp curve speed Vs to a low speed VH (about 15 to 20 [km/h]), and proceeds to step S45. Therefore, the very low speed VL is set to a value less than the low speed VH set in the case where there is no change in the lost retention time TOB. Processing in steps S43 and S44 corresponds to a passing speed setter of the disclosure.

The driving control arithmetic unit 22b of the autonomous driving control unit 22 outputs the passing-intersection/sharp curve speed Vs, set in step S42 or S43, as a target vehicle speed to the acceleration/deceleration controller 33. Then, using the passing-intersection/sharp curve speed Vs, the acceleration/deceleration controller 33 controls the output of the drive sources to allow the vehicle M to pass the intersection or the sharp curve.

Figure 6:
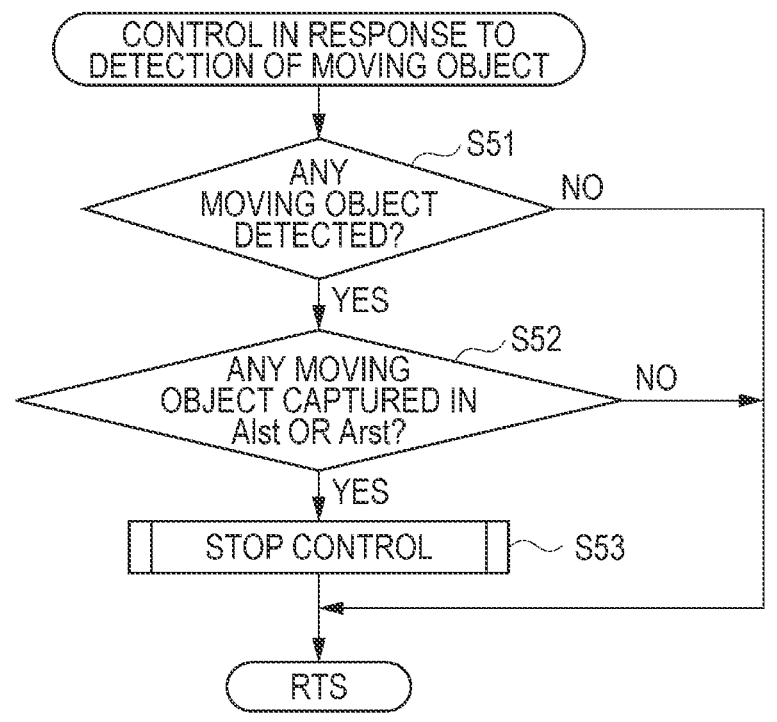
FIG. 6 is a flowchart illustrating a control routine in response to detection of a moving object.

Moreover, control in response to detection of a moving object in step S45 is executed in accordance with a control subroutine in response to detection of a moving object, which is illustrated in FIG. 6.

In this subroutine, firstly, when the vehicle M passes an intersection or a sharp curve, whether a moving object OB is detected ahead of the vehicle M is examined on the basis of the preceding driving environment information recognized by the preceding driving environment recognizer 21d of the camera unit 21. In response to detection of no moving object OB, the routine exits as it is.

In contrast, in response to detection of a moving object OB, the routine proceeds to step S52, and examines whether the moving object OB is captured in the stop area Alst or Arst in front of the vehicle M. In the case where the moving object OB is not captured in the stop area Alst or Arst, the vehicle M is allowed to pass the intersection or the sharp curve at the passing-intersection/sharp curve speed Vs set in step S42 or S43.

In contrast, in the case where the moving object OB is captured in the stop area Alst or Arst, the routine proceeds to step S53, executes stop control, and exits.

This stop control calculates, for example, a stop target vehicle speed Vtgt_st on the basis of the following equation (1), sets the target vehicle speed Vtgt at the stop target vehicle speed Vtgt_st (Vtgt←Vtgt_st), and controls the brake controller 32 to automatically stop the vehicle M just before the moving object OB:

$$Vtgt\_st = \sqrt{2 \cdot g \cdot Gtgt \cdot (Lob - Lst) + V0^2} \qquad (1$$

where g: gravitational acceleration [m/S²], Gtgt: target deceleration rate (negative acceleration rate) [%], and V0: current vehicle speed (initial speed) [km/h]. This equation (1) is for obtaining the stop target vehicle speed Vtgt_st at which the current vehicle speed V0 becomes 0 [km/h] when the vehicle M moves by (Lob−Lst) from the current vehicle speed V0 for each arithmetic period. Although the target deceleration rate Gtgt may be any fixed value that may be set in any manner, the target deceleration rate Gtgt may be a variable value set on the basis of the vehicle speed V0.

Note that (g·Gtgt) is the required deceleration (negative acceleration), and, when expressed using a=g·Gtgt, if Vtgt_st is V and (Lob−Lst) is a distance traveled x, the above-mentioned equation (1) becomes the general formula 2ax=V²−V0².

The driving control arithmetic unit 22b already recognizes the moving object OB even before the vehicle M passes the intersection or the sharp curve, and the vehicle M is driving at a speed of the very low speed VL. Therefore, since the vehicle M will not be stopped by suddenly braking the brake controller 32, even if the moving object OB jumps out in front of the vehicle M, the driver will not panic or feel uncomfortable.

After-Passing-Intersection/Sharp Curve Control

Figure 7:
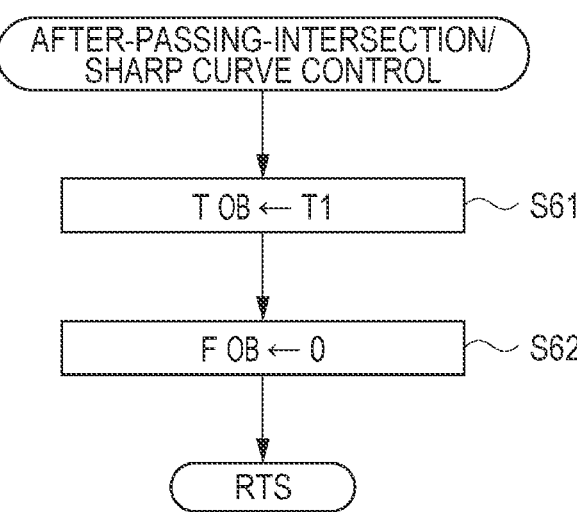
FIG. 7 is a flowchart illustrating an after-passing-intersection/sharp curve control routine.

The after-passing-intersection/sharp curve control in step S16 of FIG. 3 is executed in accordance with an after-passing-intersection/sharp curve control subroutine illustrated in FIG. 7. In the case where the vehicle M passes an intersection or a sharp curve, the routine sets the lost retention time TOB to the normal retention time T1 in step S61 (TOB←T1), clears the temporarily lost determination flag FOB in step S62 (FOB←0), and exits, thereby allowing the vehicle M to transition to normal autonomous driving. As a result, the lost retention time TOB and the passing speed Vs are returned to normal initial values.

As has been discussed thus far, in the present embodiment, even if the moving object OB is temporarily lost when the vehicle M drives through an intersection or a sharp curve, because the lost retention time TOB is set to the retention time T2 (for example, 10 [sec]) which is relatively longer than usual, the data of the moving object OB can be retained for a relatively long period of time. As a result, the passing speed Vs when the vehicle M drives through an intersection or a sharp curve is set to the very low speed VL (10 [km/h] or less). Even if the moving object OB jumps out, the vehicle M can be stopped in plenty of time, without stopping suddenly. Therefore, the driver will not panic or feel uncomfortable.

Note that the disclosure is not limited to the above-described embodiment, and, for example, the drive assist apparatus according to the disclosure is not limited to the case of being applied to the above-described function of automatic driving, but is also applicable as a function of an advanced emergency braking system (AEBS).

According to the disclosure, a moving object on a sidewalk corresponding to a curvature position that changes with a sharp curvature of a target course based on driving environment information, and a stationary object closer to a vehicle than the moving object is are recognized, and, due to movement of the vehicle, whether the moving object overlaps with the stationary object, which is closer to the vehicle, and is lost is determined; and, in the case where it is determined that the moving object is lost, a lost retention time for retaining data of the moving object is set to a longer time, and a passing speed when the vehicle passes the curvature position that changes with the sharp curvature of the target course is set to a value less than a speed set in the case where there is no change in the lost retention time. Even if a moving object that is about to cross a lane where the vehicle is driving is lost during movement and then is recognized again, the driver will not panic or feel uncomfortable.

The map locator arithmetic unit 12, preceding driving environment recognizer 21d, and the autonomous driving control unit 22 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the map locator arithmetic unit 12 including the vehicle position estimation arithmetic unit 12a, the road map information obtaining unit 12b, and the target course setting arithmetic unit 12c, the preceding driving environment recognizer 21d, and the autonomous driving control unit 22 including the moving object detection area setter 22a and the driving control arithmetic unit 22b. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A drive assist apparatus comprising:
   a driving environment information obtaining unit configured to obtain driving environment information ahead of a vehicle;

a target course setter configured to set a target course for autonomous driving set ahead of the vehicle;
   an object recognizer configured to recognize, based on the driving environment information, a moving object and a stationary object that are on a sidewalk;
   an object detection area setter configured to set an object detection area for detecting the moving object on the sidewalk ahead of the vehicle; and
   a driving control arithmetic unit configured to control a driving state of the vehicle in a case where the moving object on the sidewalk is detected in the object detection area, wherein
   the driving control arithmetic unit configured to:
      determine whether, due to movement of the vehicle, the moving object on the sidewalk at a position corresponding to a sharp curvature section of the target course where a curvature changes sharply is lost from view behind the stationary object closer to the vehicle than the moving object;
      in response to determining that the moving object is not lost from view behind the stationary object, set a first lost retention time period for retaining data of the moving object;
      in response to determining that the moving object is lost from view behind the stationary object, set a second lost retention time period for retaining the data of the moving object, the second lost retention time period being longer than the first lost retention period; and
      in response to the second lost retention time period being set for retaining the data of the moving object, set a passing speed while the vehicle passes the sharp curvature section of the target course to a value less than a speed set during the first lost retention time period,
   the object detection area setter comprises a stop area setter configured to set a stop area ahead of the vehicle, and
   the driving control arithmetic unit is configured to, under passing-sharp-curvature control, stop the vehicle in a case where the moving object is detected in the stop area, the moving object having moved from the sidewalk.

2. The drive assist apparatus according to claim 1, wherein the driving control arithmetic unit is configured to:
   execute before-entering-sharp-curvature control in a case where the target course set ahead of the vehicle changes with the sharp curvature; and
   execute the passing-sharp-curvature control in a case where the vehicle is passing through the target course that changes with the sharp curvature.

3. The drive assist apparatus according to claim 2, wherein the driving control arithmetic unit is configured to:
   execute after-passing-sharp-curvature control in a case where the vehicle passes through the target course with a set curvature or higher; and
   return the second lost retention time period to the first lost retention time period and the passing speed to the speed set during the first lost retention time period after the vehicle passes the sharp curvature section of the target course.

4. The drive assist apparatus according to claim 1, wherein the driving control arithmetic unit is configured to:
   execute after-passing-sharp-curvature control in a case where the vehicle passes through the target course with a set curvature or higher; and
   return the second lost retention time to the first lost retention time and the passing speed to the speed set for the first lost retention time period after the vehicle passes the sharp curvature section of the target course.

5. A drive assist apparatus comprising circuitry configured to:

obtain driving environment information ahead of a vehicle;

set a target course for autonomous driving set ahead of the vehicle;

recognize, based on the driving environment information, a moving object and a stationary object that are on a sidewalk;

set an object detection area for detecting the moving object on the sidewalk ahead of the vehicle;

upon detecting the moving object on the sidewalk in the object detection area, control a driving state of the vehicle;

determine whether, due to movement of the vehicle, the moving object on the sidewalk at a position corresponding to sharp curvature a section of the target course where a curvature changes sharply is lost from view behind the stationary object closer to the vehicle than the moving object;

in response to determining that the moving object is not lost from view behind the stationary object, set a first lost retention time period for retaining data of the moving object;

in response to determining that the moving object is lost from view behind the stationary object, set a second lost retention time period for retaining the data of the moving object, the second lost retention time period being longer than the first lost retention period;

in response to the second lost retention time period being set for retaining the data of the moving object, set a passing speed while the vehicle passes a sharp curvature section of the target course to a value less than a speed set during the first lost retention time period;

set a stop area ahead of the vehicle; and under passing-sharp-curvature control, stop the vehicle in a case where the moving object is detected in the stop area, the moving object having moved from the sidewalk.

* * * * *